United States Patent [19]
Gould, III

[11] 3,815,829

[45] June 11, 1974

[54] ELECTRICAL ENHANCEMENT OF PRESSURE WAVE ENERGY

[75] Inventor: Edson B. Gould, III, Newport Beach, Calif.

[73] Assignee: Energy Sciences Incorporated, El Segundo, Calif.

[22] Filed: Jan. 24, 1973

[21] Appl. No.: 326,408

[52] U.S. Cl............................ 239/102, 239/DIG. 20
[51] Int. Cl................................................. B05b 3/14
[58] Field of Search............. 239/DIG. 20, 133, 102

[56] References Cited
UNITED STATES PATENTS
1,779,849  10/1930  Lusk .................................. 239/133
3,554,443  1/1971  Hughes ....................... 239/DIG. 20

Primary Examiner—Lloyd L. King
Attorney, Agent, or Firm—Christie, Parker & Hale

[57] ABSTRACT

Pressure waves at a frequency $F_1$ are generated in a stream of fluid and electrical energy is coupled to the stream to enhance the pressure waves. The electrical energy may be coupled to the stream by a magnetic field parallel to the stream. The electrical energy may be direct current or alternating current having a frequency $F_2$, where $F_1$ and $F_2$ are preferably multiples of a common divisor.

25 Claims, 4 Drawing Figures

3,815,829
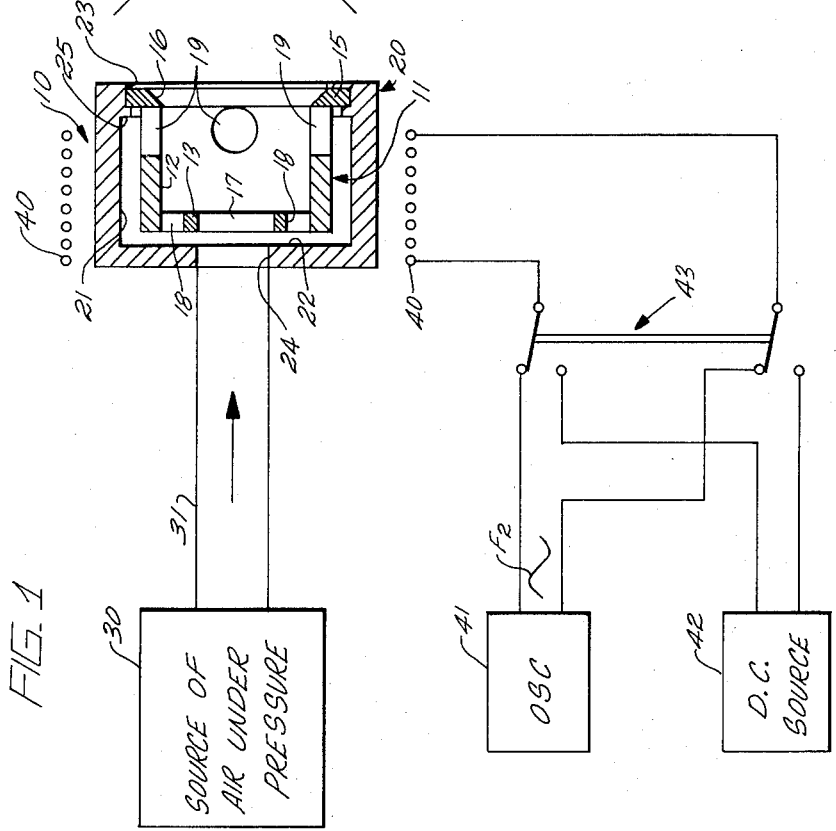
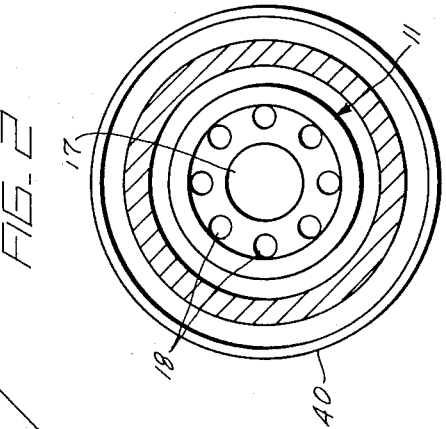

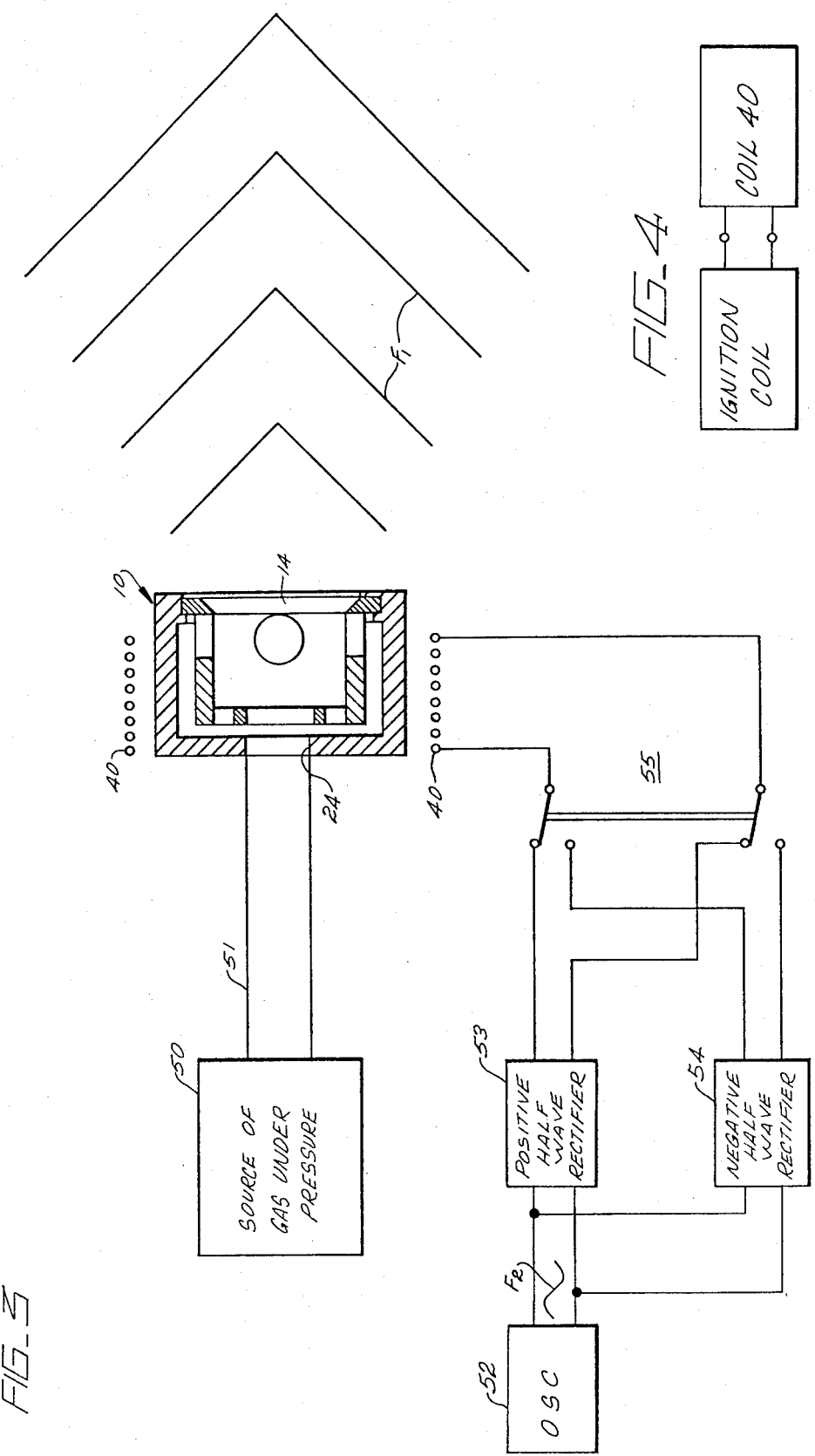

ELECTRICAL ENHANCEMENT OF PRESSURE WAVE ENERGY

BACKGROUND OF THE INVENTION

This invention relates to the energization of a fluid stream and, more particularly, to electrical enhancement of pressure waves in a fluid stream.

Hughes U.S. Pat. No. 3,554,443, which is assigned to the assignee of the present application, discloses a pressure wave generating cell in which a converging-diverging supersonic nozzle is formed by fluid boundary layers. A nozzle body open at its downstream end, bounded along its length by a side wall, and bounded at its upstream end by an end wall, forms a cylindrical passage. A core stream of fluid passes into the cylindrical passage through a large center hole in the end wall. Fluid entering the nozzle body through a plurality of smaller equally spaced auxiliary holes disposed in oppositely arranged pairs about the center hole in the end wall forms a fluid sheath around the core stream. Fluid entering the nozzle body through a plurality of oppositely disposed pairs of auxiliary holes in the side wall near the downstream end of the nozzle body stabilizes the throat plane of the nozzle. The converging-diverging boundary layer, which accelerates the fluid to supersonic velocity, is formed by the fluid entering the nozzle body through the auxiliary holes. The diameters of the holes are dimensioned so the resulting characteristic frequencies of the fluid streams passing through them reinforce each other. A cylindrical cell cover encloses the nozzle body to form around it an annular resonant chamber. The cell cover completely encloses the nozzle body, except for an opening at its upstream end that communicates with the holes of the nozzle body and except for the open downstream end of the nozzle body.

As disclosed in application Ser. No. 227,589, filed on Feb. 18, 1972 by Nathaniel Hughes, and assigned to the assignee of the present application, it has been discovered that the described pressure wave generating cell substantially ionizes the fluid passing through it.

SUMMARY OF THE INVENTION

According to the invention, it has been discovered that coupling electrical energy to a fluid stream in which pressure waves are generated substantially increases the pressure wave energy and the resulting level of ionization.

In one embodiment of the invention, electrical energy is coupled to a fluid stream by a magnetic field parallel to the stream. The electrical energy can be direct current or alternating current. In the latter case, the frequency $F_1$ of the pressure waves and the frequency $F_2$ of the alternating current of electrical energy are preferably multiples of a common divisor. More specifically, the coupling of the electrical energy to the fluid stream is most effective when the frequency of the electrical energy is synchronized to a direct multiple or submultiple of the frequency of the pressure waves. For some applications, it is desirable to employ electrical energy having a direct current component and an alternating current component.

BRIEF DESCRIPTION OF THE DRAWINGS

The features of specific embodiments of the best mode contemplated of carrying out the invention are illustrated in the drawings, in which:

FIG. 1 is a partially schematic diagram of one embodiment of apparatus for energizing a fluid stream in accordance with the principles of the invention;

FIG. 2 is a front view of the pressure wave generating cell illustrated in FIG. 1;

FIG. 3 is a partially schematic diagram of another embodiment of apparatus for energizing a fluid stream in accordance with the principles of the invention; and FIG. 4 is a block diagram showing the energization of the fluid stream of FIG. 1 with an ignition coil of an internal combustion engine.

DETAILED DESCRIPTION OF THE SPECIFIC EMBODIMENTS

In FIGS. 1 and 2 there is shown a pressure wave generating cell 10 that is identical to the cell disclosed in U.S. Pat. No. 3,554,443, which is incorporated herein by reference, except that cell 10 is preferably made from a dielectric material impregnated with a magnetic material, such as Teflon impregnated with a ceramic ferrite. Briefly, cell 10 comprises an insert 11 having a cylindrical side wall 12 and, at its upstream end, a circular end wall 13. At its downstream end, insert 11 has an outlet opening 14 and an outwardly extending flange 15. A countersink 16 circumscribes outlet opening 14. End wall 13 has a large center hole 17 and a plurality of smaller auxiliary holes 18 arranged in oppositely disposed pairs in a circle about hole 17, as shown in FIG. 2. Side wall 12 has a plurality of auxiliary holes 19 arranged at 90° intervals near outlet opening 14. A cover 20, which has a cylindrical side wall 21, a circular upstream end wall 22 and a circular downstream opening 23, surrounds insert 11. End wall 22 has an inlet hole 24 aligned with hole 17 of insert 11. The inside surface of side wall 21 has an annular shoulder 25 near opening 23. The dimensions of insert 11 and cover 20 are preferably the same as the dimensions set forth in U.S. Pat. No. 3,554,443, except for hole 24, which preferably has a diameter equal to that of hole 17.

A source 30 of air under pressure is coupled by a conduit 31 to inlet hole 24 and outlet opening 14 is exposed to the atmosphere. As described in U.S. Pat. No. 3,554,443, the air entering cell 10 through inlet hole 24 flows through holes 17, 18, and 19 to outlet opening 14. The fluid flowing through hole 17 to opening 14 forms a core stream along the axis of symmetry of cell 10; the fluid flowing through holes 18 forms a sheath between the core stream and the inside surface of side wall 12; and the fluid flowing through holes 19 forms a constriction in the core stream. Thus, the fluid flowing through holes 18 and 19 forms around the core stream a converging-diverging boundary layer that accelerates the core stream to supersonic velocity as the core stream emerges from opening 14. When the supersonic core stream encounters the ambient atmosphere adjacent to outlet opening 14, oblique shock waves having a basic frequency, $F_1$, as depicted by lines 32, are produced. The pressure wave generating cell having the dimensions stated in U.S. Pat. No. 3,554,443 produces core stream shock waves in the range of 0.170 inches to 0.195 inches depending upon the pressure. For the fluid conditions at outlet opening 14, the corresponding basic frequency, $F_1$, is about 45,000 hertz. Other frequency components at multiples and submultiples of this basic frequency are also produced by selection of the dimensions of cell 10 as taught in U.S. Pat. No. 3,554,443.

A coil 40 of an electrically conductive, insulated wire is wrapped around cover 20 in axial alignment with the core stream flowing through insert 11. An oscillator 41 produces alternating current electrical energy having a frequency $F_2$, and a source 42 produces direct current electrical energy. Oscillator 41 and source 42 are connected to coil 40 by a double pole, double throw switch 43. In this manner, either direct current or alternating current electrical energy can alternatively be coupled by coil 40 to the fluid stream passing through cell 10. A substantial increase in the pressure wave energy and the ionization level emanating from cell 10 results. It should be noted that best results are obtained when the electrical energy is coupled to the fluid stream within cell 10 by coil 40 upstream of holes 19, as illustrated in FIG. 1. The frequency $F_2$ of the alternating current electrical energy and the basic frequency $F_1$ of the pressure wave energy generated by cell 10 are multiples of a common divisor. ($F_1$ and $F_2$ are multiples of a common divisor if $F_1 = mk$, and $F_2 = nk$, where the integer $k$ is the common divisor, the integer $m$ is the multiple associated with the pressure wave energy, and the integer $n$ is the multiple associated with the aternating current electrical energy.) More specifically, the frequencies $F_1$ and $F_2$ are preferably multiply related, i.e., multiples, one of the other. By synchronizing the frequency of oscillator 41 to the basic frequency of the pressure waves generated by cell 10 in this manner, extremely efficient coupling of the electrical energy to the fluid stream can be achieved.

Even if frequencies $F_1$ and $F_2$ are not synchronized, some coupling of the electrical energy to the fluid stream does take place. The higher the voltage of the electrical energy source, the greater the coupling. Thus, the pressure wave energy can be enhanced by any suitable electrical energy source that is available. For example, when the invention is employed in the intake system of an internal combustion engine to improve performance and reduce emissions, as disclosed in application Ser. No. 227,589, filed Feb. 18, 1972, by Nathaniel Hughes and assigned to the assignee of the present application, coil 40 can be energized by the high voltage produced by the ignition system. Specifically, as depicted in FIG. 4, coil 40 could be connected in parallel with the secondary of the ignition coil, which serves as a transformer to step up the battery voltage. Although this voltage does not alternate at the frequency of the pressure waves, the relationship between the frequency of the electrical energy applied to the fluid stream and the frequency of the engine operation provides an environment for an effective electrical enhancement of the pressure waves.

In FIG. 3, cell 10 and coil 40 are identical to the components bearing the same reference numerals in FIG. 1. A source 50 of gas under pressure, which could be air or some other compressible fluid, is connected by a conduit 51 to inlet hole 24 of cell 10 and shock waves having a basic frequency $F_1$ are generated at outlet opening 14 of cell 10 in the manner described in FIG. 1. An oscillator 52 produces alternating current electrical energy having a frequency $F_2$. As stated in connection with FIG. 1, $F_1$ and $F_2$ are multiples of a common divisor and, more specifically, are preferably multiply related. Oscillator 52 is connected to a positive half-wave rectifier 53 and a negative halfwave rectifier 54, which are connected to coil 40 by a double pole, double-throw switch 55. Depending upon the state of switch 55, a pulsating electrical energy of one polarity or the other can alternatively be coupled to the fluid stream by coil 40. Thus, the arrangement of FIG. 3 couples to the fluid stream electrical energy having both an alternating current component with a frequency $F_2$ and a direct current component.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, many techniques other than that described can be employed to couple electrical energy to the fluid stream. Instead of creating a magnetic field with a coil, an electrostatic field could be created with a pair of electrodes, or an electromagnetic field could be created with a radiator.

What is claimed is:

1. A method of energizing a fluid comprising the steps of:

forming a stream of the fluid;
   generating ionized pressure waves in the stream; and
   coupling electrical energy to the stream to enhance the pressure waves.

2. The method of claim 1, in which the electrical energy is direct current.

3. The method of claim 1, in which the electrical energy is alternating current.

4. The method of claim 1, in which the pressure waves have a frequency $F_1$ and the electrical energy has a frequency $F_2$, where $F_1$ and $F_2$ are multiples of a common divisor.

5. The method of claim 1, in which the pressure waves have a frequency $F_1$ and the electrical energy has a frequency $F_2$, where $F_1$ and $F_2$ are multiply related.

6. The method of claim 1, in which the pressure waves have a frequency $F_1$, and the electrical energy includes a direct current component and at least one alternating current component having a frequency $F_2$.

7. The method of claim 6, in which $F_1$ and $F_2$ are multiples of a common divisor.

8. The method of claim 6, in which $F_1$ and $F_2$ are multiply related.

9. The method of claim 1, in which the coupling step comprises producing an electrical energy field in the stream of fluid where the pressure waves are generated.

10. The method of claim 9, in which the field is a magnetic field oriented parallel to the stream of fluid.

11. Apparatus for energizing a gas comprising:

a source of gas under pressure;
   an ambient atmosphere at a pressure lower than the source;
   means for accelerating gas from the source to a supersonic velocity;

means for releasing the gas at supersonic velocity into the ambient atmosphere to generate pressure waves therein;
a source of electrical energy; and
means for applying the electrical energy to the gas at supersonic velocity to enhance the energy of the pressure waves.

12. The apparatus of claim 11, in which the accelerating means comprises a converging-diverging nozzle designed to accelerate the fluid of the source to supersonic velocity and the releasing means comprises means for coupling the nozzle to the ambient atmosphere.

13. The apparatus of claim 12, in which the converging-diverging nozzle comprises a body defining a cylindrical passage through which gas from the source flows, and means for forming a converging-diverging fluid boundary layer in the passage from fluid of the source.

14. The apparatus of claim 13, in which the cylindrical passage comprises a nozzle body open at its downstream end, bounded along its length by a side wall, and bounded at its upstream end by an end wall having a large center hole; and the means for forming the boundary layer comprises a plurality of smaller, equally spaced, peripheral holes disposed about the center hole in the end wall in oppositely arranged pairs, a plurality of oppositely disposed pairs of throat plane stabilizing holes lying in a common plane in the side wall near the downstream end of the nozzle body; and a cylindrical cell cover enclosing the nozzle body to form an annular region surrounding the side wall of the nozzle body, the cell cover completely enclosing the nozzle body except for an opening at its upstream end that communicates with the holes of the nozzle body and except for the open downstream end of the nozzle body.

15. The apparatus of claim 14, in which the diameters of the holes are selected so their characteristic frequencies and the frequency of the pressure waves are multiply related.

16. The apparatus of claim 15, in which the annular region surrounding the side wall of the nozzle body is tuned to resonate at the frequency of the pressure waves.

17. The apparatus of claim 16, in which the coupling means comprises an electrically conductive coil connected to the source of electrical energy, the coil being disposed around the cell cover in axial alignment with the cylindrical passage to establish a magnetic field parallel to the direction of fluid flow through the nozzle.

18. The apparatus of claim 17, in which the source is direct current.

19. The apparatus of claim 17, in which the source is alternating current.

20. The apparatus of claim 19, in which the pressure waves have a frequency $F_1$ and the alternating current has a frequency $F_2$, $F_1$ and $F_2$ being multiply related.

21. The apparatus of claim 17, in which the source produces electrical energy having an alternating current component and a direct current component.

22. The apparatus of claim 21, in which the pressure waves have a frequency $F_1$ and the alternating current component has a frequency $F_2$, $F_1$ and $F_2$ being multiply related.

23. The apparatus of claim 11, in which the source comprises step-up transformer means.

24. The apparatus of claim 14, in which the source comprises step-up transformer means.

25. The apparatus of claim 16, in which the source comprises step-up transformer means.

* * * * *